US008694516B2

(12) United States Patent
Cheng (10) Patent No.: US 8,694,516 B2
(45) Date of Patent: Apr. 8, 2014

(54) GENERATING A HIERARCHY-BASED TRACE LOG

(75) Inventor: Long Fung Cheng, Fremont, CA (US)

(73) Assignee: SAP AG, Walldorf (DE)

( * ) Notice: Subject to any disclaimer, the term of this patent is extended or adjusted under 35 U.S.C. 154(b) by 450 days.

(21) Appl. No.: 12/976,633

(22) Filed: Dec. 22, 2010

(65) Prior Publication Data

US 2012/0166454 A1     Jun. 28, 2012

(51) Int. Cl.
*G06F 7/00*           (2006.01)
*G06F 17/30*         (2006.01)

(52) U.S. Cl.
USPC ................................... 707/752; 707/999.007

(58) Field of Classification Search
None
See application file for complete search history.

(56) References Cited

U.S. PATENT DOCUMENTS

| | | | | |
|---|---|---|---|---|
| 8,260,908 | B2* | 9/2012 | Chang et al. | 709/224 |
| 2004/0088320 | A1* | 5/2004 | Perry | 707/103 R |
| 2005/0097434 | A1* | 5/2005 | Storisteanu | 715/500 |
| 2007/0006174 | A1* | 1/2007 | Sohm et al. | 717/131 |
| 2009/0164979 | A1 | 6/2009 | Fischer | |
| 2012/0296870 | A1* | 11/2012 | Fu et al. | 707/625 |

OTHER PUBLICATIONS

'Flat list' [online]. Wikipedia, Sep. 2006, [retrieved on Dec. 22, 2010]. Retrieved from the Internet: <URL: http://web.archive.org/web/20060913000000/http://en.wikipedia.org/wiki/Flat_list>, 1 page.
'Tracing' [online]. Wikipedia, 2007, [retrieved on Dec. 22, 2010]. Retrieved from the Internet: <URL: http://web.archive.org/web/20080301184835/http:/en.wikipedia.org/wiki/Tracing>, 2 pages.
'Performance Trace Overview' [online]. SAP Library, [ retrieved on Dec. 22, 2010]. Retrieved from the Internet: <URL: http://help.sap.com/erp2005_ehp_04/helpdata/EN/5a/ace273ca0211d194b500a0c94260a5/frameset.htm>, 1 page.
'Performance Analysis' [online], SAP Library, [retrieved on Dec. 22, 2010] Retrieved from the Internet: <URL: http://help.sap.com/erp2005_ehp_04/helpdata/EN/d1/801f7c454211d189710000e8322d00/frameset.htm>, 1 page.
'Creating a Stack Trace' [online]. SAP Library, [retrieved on Dec. 22, 2010]. Retrieved from the Internet: <URL: http://help.sap.com/erp2005_ehp_04/helpdata/EN/2c/7b09411178b167e10000000a155106/frameset.htm>, 1 page.
'Analysis and Repair Environment' [online]. SAP Library, [retrieved on Dec. 22, 2010]. Retrieved from the Internet: <URL: http://help.sap.com/erp2005_ehp_04/helpdata/En/92/1d733b73a8f706e10000000a11402f/frameset.htm>, 4 pages.

* cited by examiner

*Primary Examiner* — Azam Cheema
(74) *Attorney, Agent, or Firm* — Fish & Richardson P.C.

(57) ABSTRACT

A computer-implemented method for generating a hierarchy-based trace log includes: receiving a log generated by a trace program performed in a computer system, the log having entries organized by sequence number, each entry including an object key for an object involved in the traced event and a log message about the traced event; identifying all object keys that occur in the log; assigning different separation values to each of the entries; generating respective adjusted sequence numbers for all of the entries by combining each entry's sequence number with the separation value for that entry; and storing an adjusted log having entries organized by the adjusted sequence numbers.

12 Claims, 8 Drawing Sheets

| Object key | Level | Sequence | Adjust Sequence |
|---|---|---|---|
| Obj_1 | 1 | 1 | 1 |
| | 2 | 2 | 2 |
| | 2 | 3 | 3 |
| Obj_2 | 1 | 4 | 1004 |
| | 2 | 5 | 1005 |
| | 3 | 6 | 1006 |
| | 3 | 7 | 1007 |
| Obj_1 | 1 | 8 | 8 |
| | 2 | 9 | 9 |
| | 3 | 10 | 10 |
| Obj_2 | 1 | 11 | 1011 |
| | 2 | 12 | 1012 |
| | 2 | 13 | 1013 |
| | 3 | 14 | 1014 |
| Obj_1 | 1 | 15 | 15 |
| | 2 | 16 | 16 |
| | 3 | 17 | 17 |
| Obj_2 | 1 | 18 | 1018 |
| | 2 | 19 | 1019 |
| | 2 | 20 | 1020 |

| Object key (302) | Level (304) | Sequence (306) | Message text (307) |
|---|---|---|---|
| Obj_1 | 1 | 1 | |
| Obj_1 | 2 | 2 | |
| Obj_1 | 2 | 3 | |
| Obj_2 | 1 | 4 | |
| Obj_2 | 2 | 5 | |
| Obj_2 | 3 | 6 | |
| Obj_2 | 3 | 7 | |
| Obj_1 | 1 | 8 | |
| Obj_1 | 2 | 9 | |
| Obj_1 | 3 | 10 | |
| Obj_2 | 1 | 11 | |
| Obj_2 | 2 | 12 | |
| Obj_2 | 2 | 13 | |
| Obj_2 | 3 | 14 | |
| Obj_1 | 1 | 15 | |
| Obj_1 | 2 | 16 | |
| Obj_1 | 3 | 17 | |
| Obj_2 | 1 | 18 | |
| Obj_2 | 2 | 19 | |
| Obj_2 | 2 | 20 | |

FIG. 3A

| Object key | Level | Sequence | Adjust Sequence |
|---|---|---|---|
| Obj_1 | 1 | 1 | 1 |
|  | 2 | 2 | 2 |
|  | 2 | 3 | 3 |
| Obj_2 | 1 | 4 | 1004 |
|  | 2 | 5 | 1005 |
|  | 3 | 6 | 1006 |
|  | 3 | 7 | 1007 |
| Obj_1 | 1 | 8 | 8 |
|  | 2 | 9 | 9 |
|  | 3 | 10 | 10 |
| Obj_2 | 1 | 11 | 1011 |
|  | 2 | 12 | 1012 |
|  | 2 | 13 | 1013 |
|  | 3 | 14 | 1014 |
| Obj_1 | 1 | 15 | 15 |
|  | 2 | 16 | 16 |
|  | 3 | 17 | 17 |
| Obj_2 | 1 | 18 | 1018 |
|  | 2 | 19 | 1019 |
|  | 2 | 20 | 1020 |

| Level ⌐304 | Adjust Sequence ⌐308 | Message text ⌐307 |
|---|---|---|
| 1 | 1 | |
| 2 | 2 | |
| 2 | 3 | |
| 1 | 1004 | |
| 2 | 1005 | |
| 3 | 1006 | |
| 3 | 1007 | |
| 1 | 8 | |
| 2 | 9 | |
| 3 | 10 | |
| 1 | 1011 | |
| 2 | 1012 | |
| 2 | 1013 | |
| 3 | 1014 | |
| 1 | 15 | |
| 2 | 16 | |
| 3 | 17 | |
| 1 | 1018 | |
| 2 | 1019 | |
| 2 | 1020 | |
| | | |
| | | |
| | | |

| Level | Adjust Sequence | Message text |
|---|---|---|
| 1 | 1 | |
| 2 | 2 | |
| 2 | 3 | |
| 1 | 8 | |
| 2 | 9 | |
| 3 | 10 | |
| 3 | 15 | |
| 1 | 16 | |
| 2 | 17 | |
| 3 | 1004 | |
| 1 | 1005 | |
| 2 | 1006 | |
| 2 | 1007 | |
| 3 | 1011 | |
| 1 | 1012 | |
| 2 | 1013 | |
| 3 | 1014 | |
| 1 | 1018 | |
| 2 | 1019 | |
| 2 | 1020 | |
| | | |
| | | |
| | | |

GENERATING A HIERARCHY-BASED TRACE LOG

TECHNICAL FIELD

This document relates to generating a hierarchy-based trace log.

BACKGROUND

Computer systems are configured to include a collection of modules, components or other entities that take part in the operation of the system and that can affect its behavior in one or more ways. Such units can be considered the modules that make up the system and they are often implemented as software components. Software can be written in any of a number of programming languages and is generally used to cause a processor to execute specific instructions. However, after designing such a system it may be desirable to test or otherwise investigate one or more aspects thereof to verify whether it works, or will work, as intended.

Trace programs exist for investigating the individual operations performed in executing a business process. For example, trace programs generate a log of messages that correspond to various events occurring in the program execution. Trace logs are chronologically organized based on the order that events occur and the messages are generated.

SUMMARY

The invention relates to generating a hierarchy-based trace log.

In a first aspect, a computer-implemented method for generating a hierarchy-based trace log includes: receiving a log generated by a trace program performed in a computer system, the log having entries organized by sequence number, each entry including an object key for an object involved in the traced event and a log message about the traced event; identifying all object keys that occur in the log; assigning different separation values to each of the entries; generating respective adjusted sequence numbers for all of the entries by combining each entry's sequence number with the separation value for that entry; and storing an adjusted log having entries organized by the adjusted sequence numbers.

In a second aspect, a computer program product tangibly embodied in a computer-readable storage medium includes instructions that when executed by a processor perform a method for generating a hierarchy-based trace log. The method includes: receiving a log generated by a trace program performed in a computer system, the log having entries organized by sequence number, each entry including an object key for an object involved in the traced event and a log message about the traced event; identifying all object keys that occur in the log; assigning different separation values to each of the entries; generating respective adjusted sequence numbers for all of the entries by combining each entry's sequence number with the separation value for that entry; and storing an adjusted log having entries organized by the adjusted sequence numbers. In a third aspect, a system includes: processor; and computer program product tangibly embodied in a computer-readable storage medium and comprising instructions that when executed by a processor perform a method for generating a hierarchy-based trace log. The method includes: receiving a log generated by a trace program performed in a computer system, the log having entries organized by sequence number, each entry including an object key for an object involved in the traced event and a log message about the traced event; identifying all object keys that occur in the log; assigning different separation values to each of the entries; generating respective adjusted sequence numbers for all of the entries by combining each entry's sequence number with the separation value for that entry; and storing an adjusted log having entries organized by the adjusted sequence numbers.

Implementations can include any or all of the following features. n object keys are identified as occurring in the log, the method further comprising: selecting a separation key k; and obtaining each of the separation values by multiplying k with (i−1), for every i from 1 to n. Generating the adjusted sequence numbers comprises combining the respective sequence number with the corresponding separation value using an arithmetic operation. The method further includes removing the object keys before storing the adjusted log. Each entry in the log further includes a level indicator for the corresponding traced event, and wherein the level indicators are also included in the entries of the adjusted log. The method further includes presenting to a user a hierarchy-based trace log generated from the adjusted log.

Implementations can provide any or all of the following advantages. A hierarchical trace log can be generated that is based on an object structure. Analysis of system operation can be made more convenient and efficient by organizing logged events according to a hierarchy of business objects.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which a hierarchy-based trace log can be generated. A trace log that is originally created with entries in chronological order can be reorganized to present the entries according to the hierarchy of the objects involved. This can provide a more comprehensible trace log, particularly to a user who is familiar with the business object(s) involved.

Figure 1:
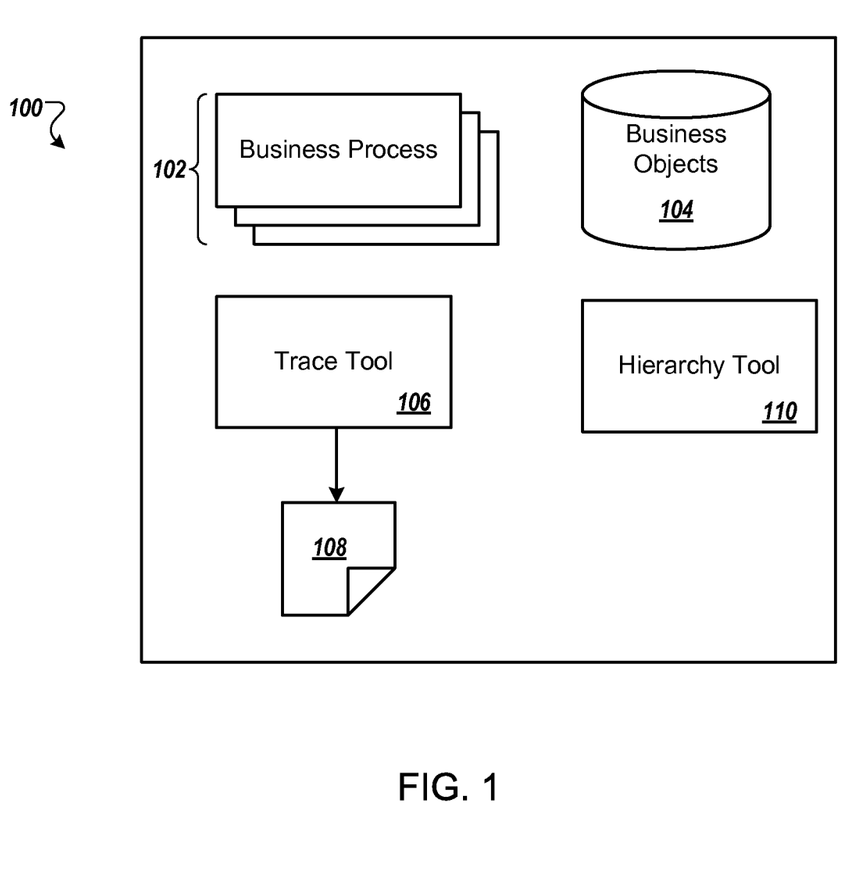
FIG. 1 is a block diagram of a system that can be used for generating a hierarchy-based trace log.

FIG. 1 is a block diagram of a system 100 that can be used for generating a hierarchy-based trace log. The system 100 performs one or more business processes 102 that can for example involve transactional data from a company or other organization. In some implementations, the system 100 is configured for performing enterprise resource planning (ERP) functions. To that end the system 100 can include one or more other components (e.g., ERP-specific applications or other programs) that are not explicitly shown here for clarity. The system 100 can be implemented using one or more processor-based devices, for example at least one server device.

Each of the business processes 102 uses one or more of multiple business objects 104 that are defined in the system 100. Examples of business objects include, but are not limited to: sales orders, invoices, bills-of-material, schedules, and customer records. The business objects 104 include multiple nodes for defining and managing individual portions of the object's data. The nodes are organized in a hierarchy that is common to two or more of the objects. For example, the hierarchy reflects which nodes are included in the particular object and their individual relationships.

The system 100 includes at least one trace tool 106 that can track operations in each of the business processes 102. In the tracing, individual ones of the business objects 104 are identified as they undergo the various processing steps. The trace tool 106 generates one or more logs 108 that contain entries reflecting the traced operations. For example, the trace tool 106 is invoked when there is a need to investigate system operation, such as when a new one of the business processes is being introduced, or for regular quality assurance checks. In this implementation, the trace tool is implemented in the system 100, and in other implementations the trace tool is implemented in another system.

The system 100 includes a hierarchy tool 110 that can generate one or more types of log that are based on the hierarchies of the involved objects. The hierarchy tool can be implemented as executable code stored in a computer-readable medium, to name just one example. Examples of generating hierarchy-based logs are described below. In this implementation, the hierarchy tool is implemented in the system 100, and in other implementations the hierarchy tool is implemented in another system.

Figure 2:
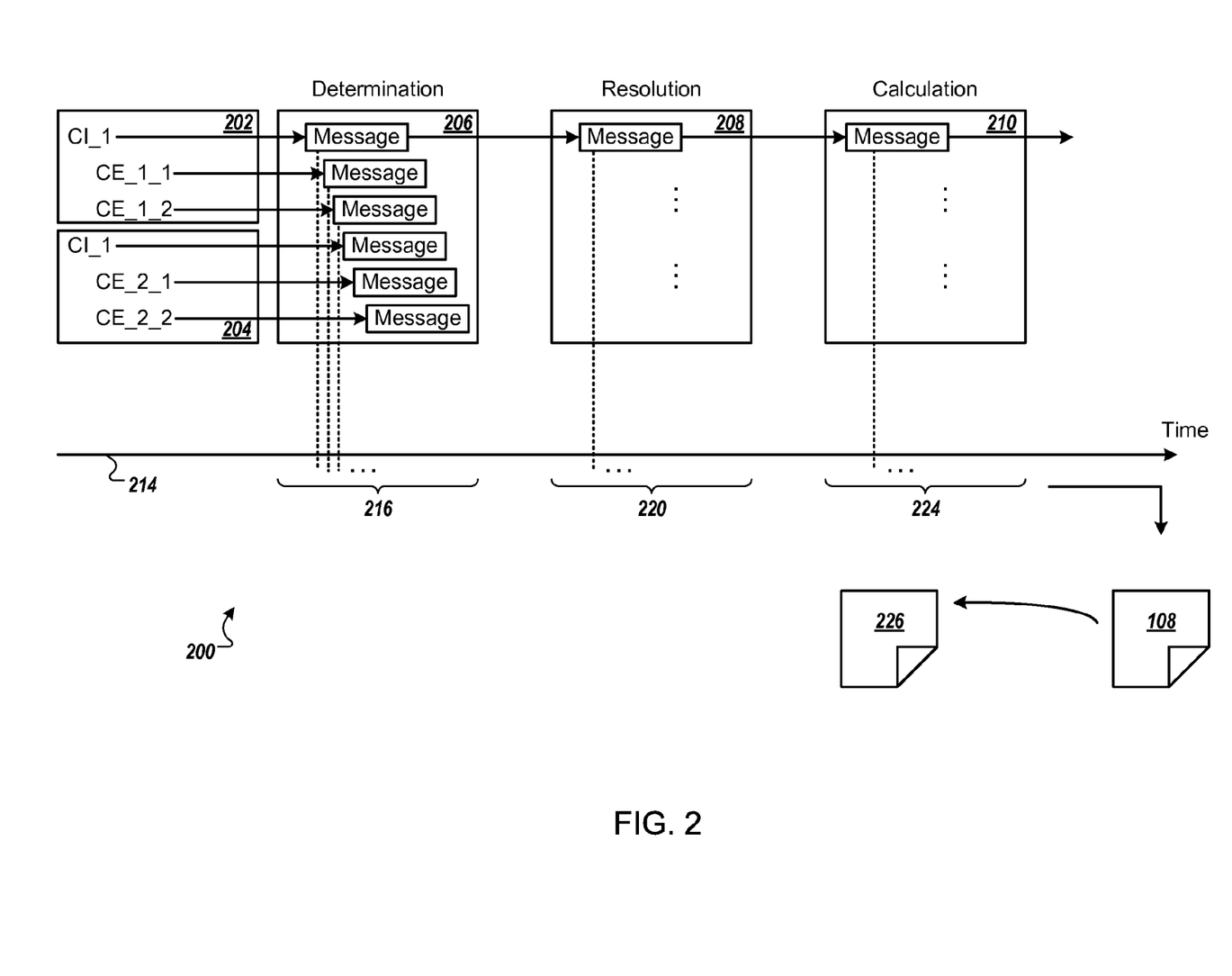
FIG. 2 schematically shows a business process where tracing is performed.

FIG. 2 schematically shows a business process 200 where tracing is performed. The business process 200 is here performed on two objects 202 and 204, which will each be subjected to the procedures of the business process in this example: A determination procedure 206, a resolution procedure 208 and a calculation procedure 210. Other procedures can be used in addition to, or instead of, the ones shown.

The objects 202 and 204 in this example relate to charges that are used in an accounting context. Here, each of the objects 202 and 204 is a "charge item," meaning that it represents an item that is part of calculating a charge to be applied in a specific situation. Accordingly, the parent nodes of the objects are referred to as CI_1 and CI_2, respectively.

Each object can have one or mode child nodes under a parent node. Here, the objects have two child nodes each that relate to charge elements. Particularly, for the object 202 the child nodes are referred to as CE_1_1 and CI_1_2, respectively. Similarly, for the object 204 the child nodes are referred to as CE_2_1 and CI_2_2, respectively. In other implementations, other nodes and/or different numbers of nodes can be used.

When the parent node CI_1 is processed in the determination procedure 206, this event generates a message 212 that is tracked by the trace tool 106 (FIG. 1). For example, the message 212 identifies an object key of the object 202, specifies the operation(s) performed, and notes a date stamp for the processing. Measured against a time axis 214, the message 212 is seen to be the first one generated in the processing of the objects 202 and 204 in this example. Similarly, the determination procedure 206 causes a corresponding message to be generated for each of child nodes in the objects. Also, when the other parent node CI_2 and its child nodes CE_2_1 and CI_2_2 are processed in the determination procedure 206, corresponding messages are generated.

As each message is registered in a trace log, they form a procedure-related chronology 216, as schematically illustrated.

Likewise, when the resolution procedure 208 is performed, corresponding messages are generated for all parent and child nodes of the two objects 202 and 204. For clarity, only a first message 218, for the parent node CI_1, shown here. A resolution-related chronology 220 is formed by the respective messages from the resolution procedure 208.

Finally, the calculation procedure 210 is performed in this example, generating corresponding messages for all parent and child nodes, of which only a first message 222 is shown here. The respective messages from the calculation procedure 210 form a calculation-related chronology 224. The chronologies 216, 220 and 224, when taken together, make up the trace log 108. That is, the trace log 108 lists all the messages (e.g., the messages 212, 218 and 222) in the order that the corresponding events occurred in the processing of the objects 202 and 204. Using the hierarchy tool 110 (FIG. 1), a hierarchy log 226 can be generated that contains all entries from the tracing and that is organized according to the hierarchy of the objects 202 and 204.

FIGS. 3A-D show trace logs that can be generated. Beginning with FIG. 3A, it shows a log 300 that can be generated by the trace tool 106 (FIG. 1), for example. The log 300 contains entries organized on separate rows, each entry corresponding to a detected message. Here, the entries have respective values in each column of: An object key column 302, a level column 304, a sequence column 306 and a message text column 307. For clarity the contents of the column 307 are not shown in this example.

Figure 3A:
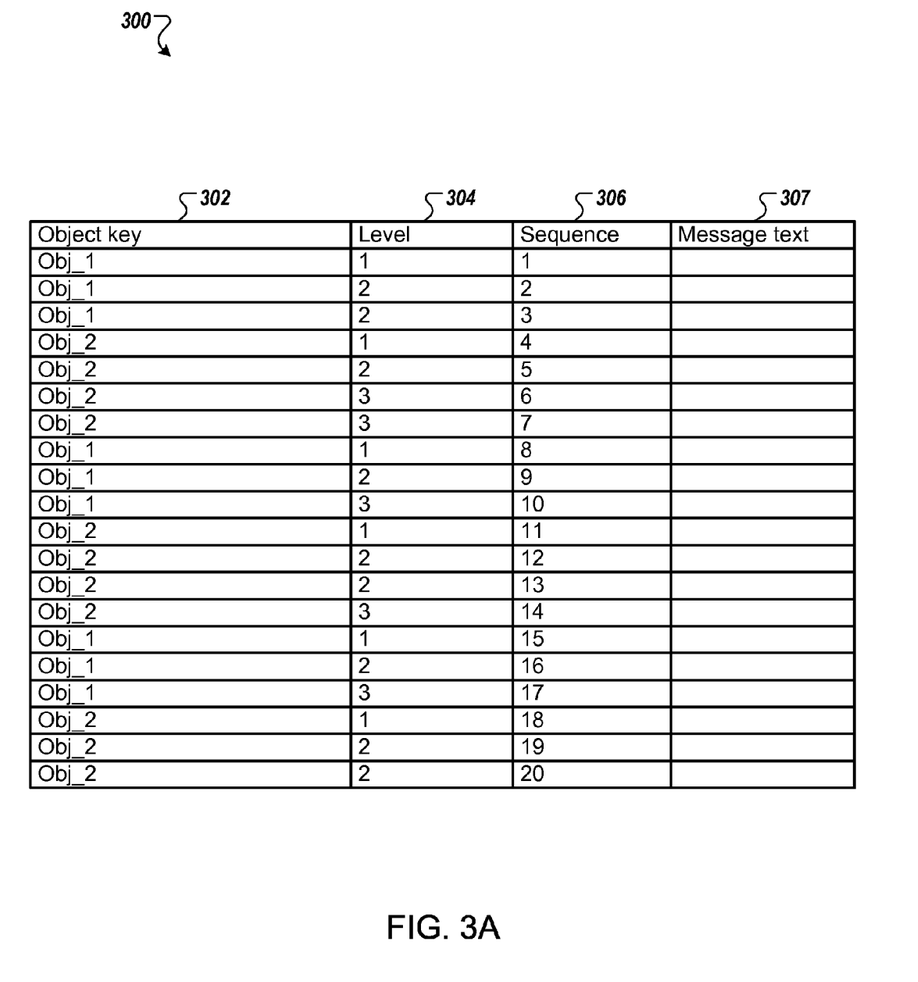
FIGS. 3A-D show trace logs that can be generated.

For example, in this example two separate objects are involved and their keys in the column 302 are therefore denoted Obj_1 and Obj_2, respectively. It is seen that some entries having the Obj_2 key are located higher in the log 300 than some entries with the Obj_1 key.

The level column 304 indicates the level to which the trace message relates. In some implementations, the level value corresponds to the type of node in the object hierarchy. For example, a grandparent node receives a "1" level value, a child node a "2" value, and so on.

Here, the log 300 numbers the rows by incrementing numerals in the sequence column 306. For example, the first message entry that is made in the log 300 is assigned the sequence number "1", the second one the number "2", and so on. In other implementations, the sequence numbering is not explicit but rather implied by the ordering of the respective entries.

The log 300 will now be used to generate one or more hierarchy logs (e.g., the log 226 in FIG. 2). In some implementations, this is done by reorganizing the entries in the log 300. In the current example, the reorganization is done by generating an adjusted sequence number for each entry.

First, it is decided how much the various entries should be separated from each other. This can involve determining how many separate objects are involved in the entire log 300. Here, that determination yields two objects, based on detecting the object keys Obj_1 and Obj_2. Also, it can be determined that the total number of entries to be reorganized is 20. It follows that the maximum number of entries that might need to be inserted between any two entries is 18. Based on this, a separation number that provides more separation than 18 can be selected. Here, to err on the side of more separation rather than too little (in which case collisions between reorganized entries can occur), a separation key of 1000 is selected, just as an example.

Figure 3B:
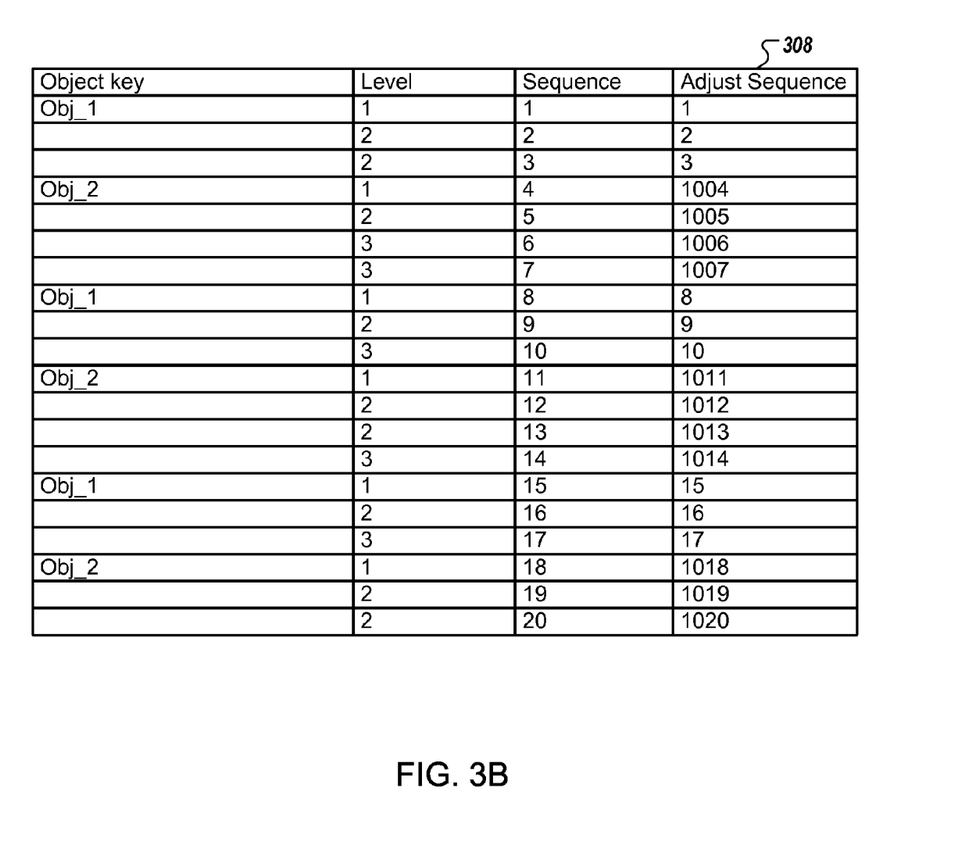

Each entry will be assigned an adjusted sequence number based on its current sequence number and the separation key, for example as illustrated in FIG. 3B. Particularly, here a different separation value is assigned to each of the two objects. For example, the Obj_1 is assigned a separation value of 0 (zero) and the Obj_2 is assigned a separation value of 1000.

For each entry, the separation value of its corresponding object is added to the entry's sequence number. This yields a unique adjusted sequence number for each entry, which are registered in a column 308. That is, for every entry relating to the Obj_1 object, the value 0 (zero) is added to the corresponding sequence number (or, alternatively, no addition is performed), and for every entry relating to the Obj_2 object, the value 1000 is added to the corresponding sequence number. In the current example, this yields the adjusted sequence numbers shown in the column 308.

In a more general sense, the above example corresponds to the following.

It is determined that n object keys occur in the log (here, n=2).

A separation key k is selected (here, k=1000).

An incremental variable i for the entries is defined.

For every i from 1 to n, the separation key k is multiplied with (i−1) to obtain the corresponding separation value. That is, for i=1 the separation value becomes 1000*(1−1)=0, and for i=2 the separation value becomes 1000*(2−1)=1000.

The separation value for the respective object key is added to the sequence numbers of all entries relating to the object.

Figure 3C:
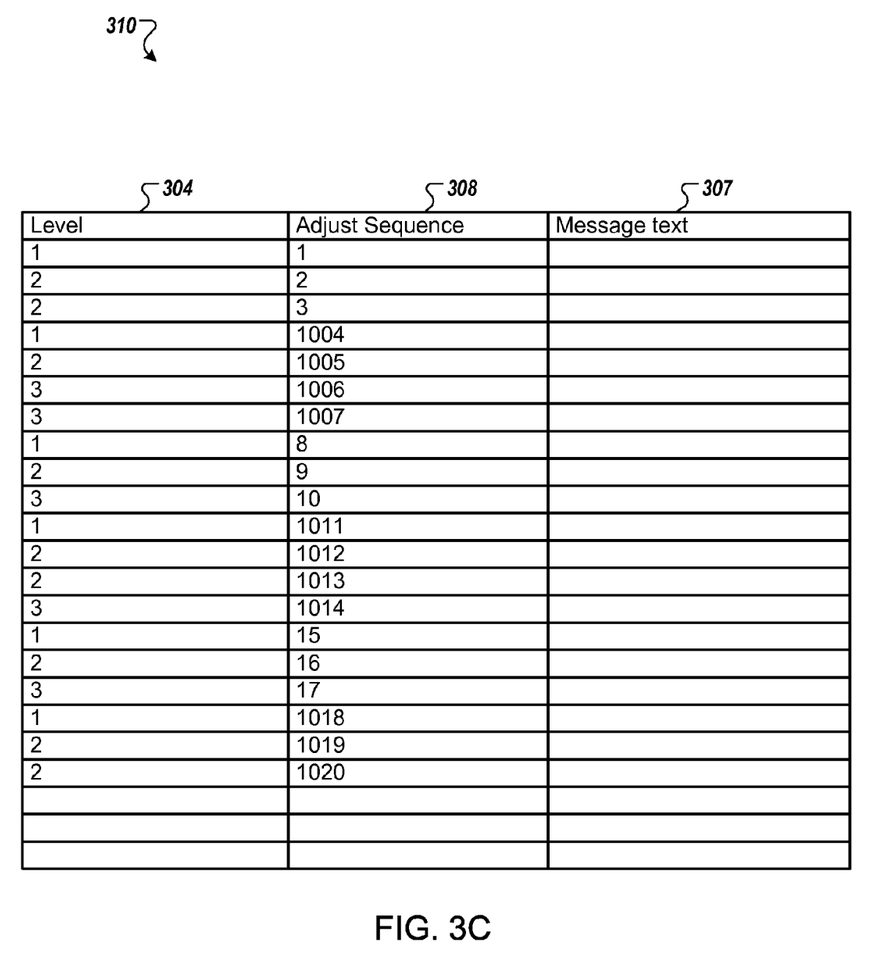

FIG. 3C shows the result of removing some information from the entries that have been assigned the adjusted sequence numbers. Here, a log 310 includes the level column 304, the adjusted sequence column 308 and the message text column 307. It is seen that the adjusted sequence numbers do not run in numerical order. The object key column 302 (FIG. 3A) and the sequence number column 306 (FIG. 3A) are no longer significant and have been omitted in the log 310.

Figure 3D:
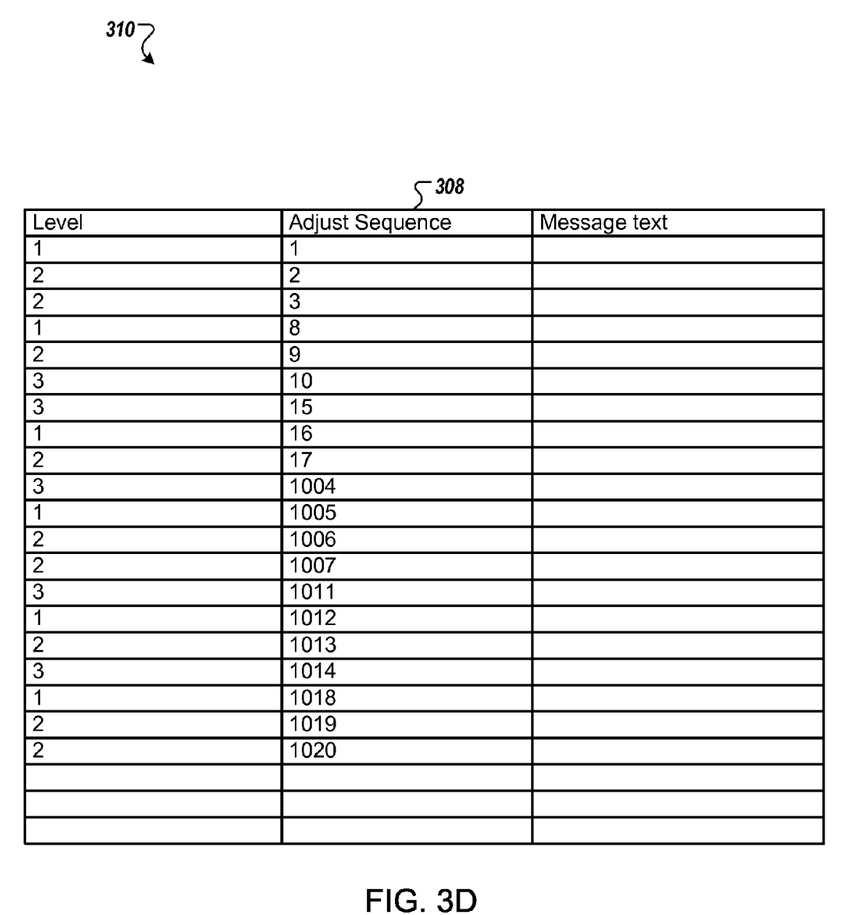

FIG. 3D, finally, shows the result of sorting the log 310 according to the adjusted sequence numbers. In the column 308, it is seen that the lowest adjusted sequence number is 1 and the highest number is 1020. Particularly, it can be seen that the messages relating to the Obj_1, which have adjusted sequence numbers 1-17, are not commingled with any of the messages relating to the Obj_2, which have adjusted sequence numbers 1004-1020. Moreover, the order of messages within the group for each object corresponds to the order in which the nodes were processes—i.e., the order reflects the hierarchy or other structure of the object.

Above, each entry's sequence number was combined with the corresponding separation value by addition: For example, the sequence number 4 was added to 1000 to obtain the adjusted sequence number 1004. In some implementations, a combination can be made in various ways that yield unique separation numbers. For example, any arithmetic operation (e.g., addition, subtraction, multiplication or division) can be used.

Figure 4:
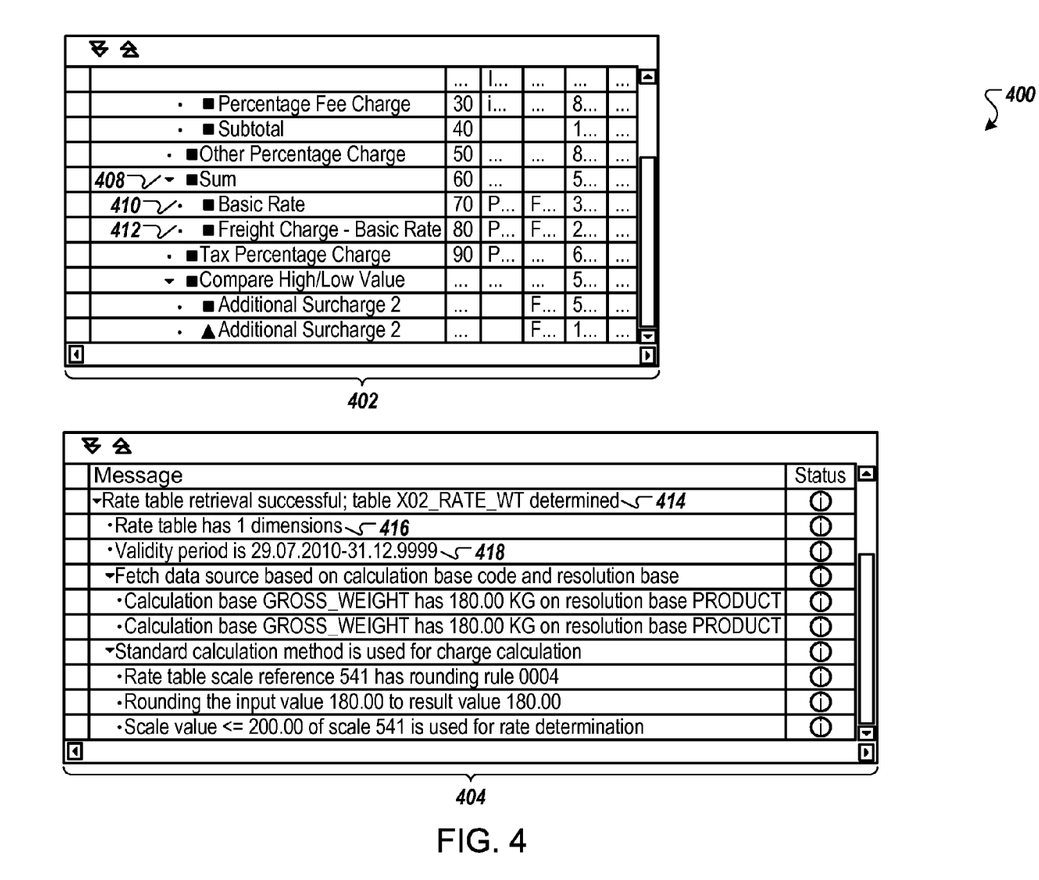
FIG. 4 shows an example of a hierarchy-based trace log.

The log 310 can be used for one or more purposes, for example to present trace results to a user. FIG. 4 shows an example of a hierarchy-based trace log 400. Here, the log 400 includes a hierarchy structure area 402 and a trace message area 404. The hierarchy structure area 402 indicates the hierarchy of the object(s) included in the trace. For example, a node 408 has two child nodes 410 and 412.

The trace message area 404 includes message text information from the column 307 (FIG. 3A). The text is organized according to the object structure(s). For example, an entry 414 here indicates that a rate table was successfully retrieved. Here, the rate table was determined to have one dimension, and an entry 416 sorted under the entry 414 therefore has an indented left margin. Similarly, an entry 418 that also is sorted under the entry 414 indicates the determined validity data range for the rate table.

Other ways of presenting trace log information based on object hierarchy can be used. For example, the various entries can be presented in a temporal sequence where all entries relating to one object are first presented, before entries relating to another object are shown.

Figure 5:
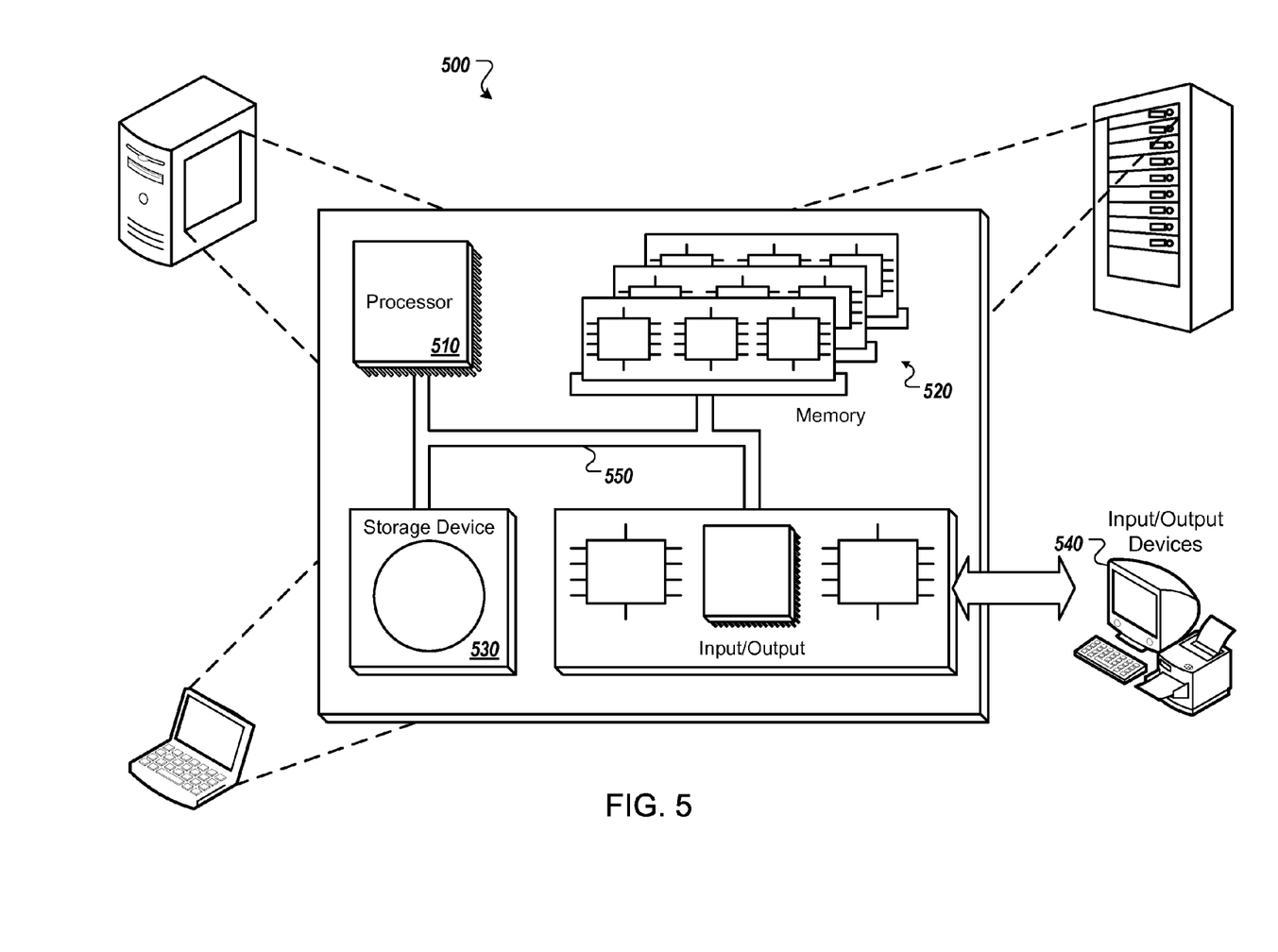
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method, comprising:
    receiving a log generated by a trace program performed in a computer system, the log having entries that (a) each have a sequence number such that the log includes multiple sequence numbers, and (b) are organized by the sequence numbers for the entries, each entry including (i) an object key for an object involved in a traced event, (ii) a log message about the traced event, and (iii) a level indicator for the traced event;
    identifying all object keys that occur in the log, wherein n object keys are identified as occurring in the log;
    selecting a separation key;
    assigning a separation value to at least some of the entries, wherein the separation value for each of the at least some entries is determined by performing an arithmetic operation on the separation key with (i−1), for every i from 1 to n;
    generating, using an automatic operation, adjusted sequence numbers for one or more of the entries by combining the sequence number for each of the one or more entries with the separation value for that entry; and
    storing an adjusted log having entries organized by the adjusted sequence numbers, wherein the level indicators are also included in the entries of the adjusted log.

2. The computer-implemented method of claim 1, wherein generating the adjusted sequence numbers comprises combining the sequence number for each of the one or more entries with the corresponding separation value for that entry using an arithmetic operation.

3. The computer-implemented method of claim 1, further comprising removing the object keys before storing the adjusted log.

4. The computer-implemented method of claim 1, further comprising presenting to a user a hierarchy-based trace log generated from the adjusted log.

5. A computer program product tangibly embodied in a computer-readable storage medium and comprising instructions that when executed by a processor perform a method, comprising:
    receiving a log generated by a trace program performed in a computer system, the log having entries that (a) each have a sequence number such that the log includes multiple sequence numbers, and (b) are organized by the sequence numbers for the entries, each entry including (i) an object key for an object involved in a traced event, (ii) a log message about the traced event, and (iii) a level indicator for the traced event;
    identifying all object keys that occur in the log, wherein n object keys are identified as occurring in the log;
    selecting a separation key;
    assigning a separation value to at least some of the entries, wherein the separation value for each of the at least some entries is determined by performing an arithmetic operation on the separation key with (i−1), for every i from 1 to n;
    generating, using an automatic operation, adjusted sequence numbers for one or more of the entries by combining the sequence number for each of the one or more entries with the separation value for that entry; and
    storing an adjusted log having entries organized by the adjusted sequence numbers, wherein the level indicators are also included in the entries of the adjusted log.

6. The computer program product of claim 5, wherein generating the adjusted sequence numbers comprises combining the sequence number for each of the one or more entries with the corresponding separation value for that entry using an arithmetic operation.

7. The computer program product of claim 5, the method further comprising removing the object keys before storing the adjusted log.

8. The computer program product of claim 5, the method further comprising presenting to a user a hierarchy-based trace log generated from the adjusted log.

9. A system comprising:
    a processor; and
    a computer program product tangibly embodied in a computer-readable storage medium and comprising instructions that when executed by a processor perform a method, comprising:
        receiving a log generated by a trace program performed in a computer system, the log having entries that (a) each have a sequence number such that the log includes multiple sequence numbers, and (b) are organized by the sequence numbers for the entries, each entry including (i) an object key for an object involved in a traced event, (ii) a log message about the traced event, and (iii) a level indicator for the traced event;

identifying all object keys that occur in the log, wherein n object keys are identified as occurring in the log;

selecting a separation key;

assigning a separation value to at least some of the entries, wherein the separation value for each of the at least some entries is determined by performing an arithmetic operation on the separation key with (i−1), for every i from 1 to n;

generating, using an automatic operation, adjusted sequence numbers for one or more of the entries by combining the sequence number for each of the one or more entries with the separation value for that entry; and storing an adjusted log having entries organized by the adjusted sequence numbers, wherein the level indicators are also included in the entries of the adjusted log.

10. The system of claim 9, wherein generating the adjusted sequence numbers comprises combining the sequence number for each of the one or more entries with the corresponding separation value for that entry using an arithmetic operation.

11. The system of claim 9, the method further comprising removing the object keys before storing the adjusted log.

12. The system of claim 9, the method further comprising presenting to a user a hierarchy-based trace log generated from the adjusted log.

\* \* \* \* \*